(12) United States Patent
Terai et al.

(10) Patent No.: US 10,941,858 B2
(45) Date of Patent: Mar. 9, 2021

(54) TRANSMISSION-EQUIPPED VEHICLE (71) Applicant: KAWASAKI JUKOGYO KABUSHIKI KAISHA, Kobe (JP)

(72) Inventors: Shohei Terai, Kobe (JP); Daisuke Kawai, Kobe (JP); Yuka Matsumoto, Himeji (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 107 days.

(21) Appl. No.: 16/522,968

(22) Filed: Jul. 26, 2019

(65) Prior Publication Data

US 2020/0040989 A1 Feb. 6, 2020

(30) Foreign Application Priority Data

Aug. 6, 2018 (JP) .............................. JP2018-147448

(51) Int. Cl.
*F16H 61/18* (2006.01)
*F16H 61/02* (2006.01)
*F16H 61/16* (2006.01)
*F16H 61/32* (2006.01)
*F16H 61/04* (2006.01)

(52) U.S. Cl.
CPC .......... *F16H 61/18* (2013.01); *F16H 61/0248* (2013.01); *F16H 61/04* (2013.01); *F16H 2061/0244* (2013.01); *F16H 2061/166* (2013.01); *F16H 2061/326* (2013.01)

(58) Field of Classification Search
CPC ............... F16H 2059/006; F16H 59/04; F16H 2061/0244; F16H 2061/1204; F16H 2061/161; F16H 61/0248; F16H 61/12; F16H 61/16; F16H 61/18
See application file for complete search history.

(56) References Cited

U.S. PATENT DOCUMENTS

| | | | |
|---|---|---|---|
| 5,038,627 A * | 8/1991 | Schwaiger | F16H 63/36 74/335 |
| 5,205,180 A * | 4/1993 | Moroto | F16H 59/0204 74/335 |
| 2013/0073153 A1* | 3/2013 | Sakamoto | G06F 17/00 701/52 |
| 2013/0152718 A1* | 6/2013 | Matsuo | F16H 61/16 74/336 R |
| 2014/0095041 A1* | 4/2014 | Nakamura | F16D 21/02 701/68 |
| 2014/0343809 A1* | 11/2014 | Reichler | F16H 61/68 701/58 |

FOREIGN PATENT DOCUMENTS

JP 2012237347 A 12/2012

* cited by examiner

*Primary Examiner* — Edwin A Young
(74) *Attorney, Agent, or Firm* — Alleman Hall Creasman & Tuttle LLP (57) ABSTRACT

A controller includes: an automatic shifting control section that carries out automatic shifting control in which a shifting actuator is driven in response to a predetermined automatic shifting command; and an interference prevention control section that controls the automatic shifting control section so as to prohibit simultaneous occurrence of a manual shifting process induced by operation of a shifting operation member and an automatic shifting process induced by the shifting actuator.

8 Claims, 3 Drawing Sheets

TRANSMISSION-EQUIPPED VEHICLE

CROSS-REFERENCE TO RELATED APPLICATION

This application claims priority to and the benefit of Japanese Patent Application No. 2018-147448, filed on Aug. 6, 2018, the entire disclosure of which is incorporated herein by reference.

BACKGROUND OF THE INVENTION

Field of the Invention

The present invention relates to a vehicle equipped with a manual transmission that changes rotational speed derived from rotational power output from a prime mover.

Description of the Related Art

Japanese Laid-Open Patent Application Publication No. 2012-237347 discloses a shifting system operable in an automatic shifting mode and in a manual shifting mode. In the automatic shifting mode, a shift control motor is driven to actuate a transmission when a parameter such as the vehicle speed meets a predetermined condition. In the manual shifting mode, the shift control motor is driven to actuate the transmission upon operation of a shift selection switch by the driver.

However, with the configuration disclosed in Japanese Laid-Open Patent Application Publication No. 2012-237347, the shifting power that causes the transmission to perform a shifting process is a drive force generated by the shift control motor, rather than an operation force applied by the driver, even in the manual shifting mode. Thus, the driver receives no reaction force from the transmission during shifting operation in the manual shifting mode and therefore cannot experience the feeling of mechanically shifting the transmission. This diminishes the pleasure of vehicle driving.

If a shifting operation member (e.g., a shifting operation lever) to be operated by the driver is mechanically connected to the transmission, the shifting operation member is mechanically connected also to the shift control motor. This causes a mechanical resistance derived from the motor during operation of the shifting operation member by the driver, thus imposing an operational burden on the driver. Even if a configuration can be made in which no motor-derived mechanical resistance occurs during operation of the shifting operation member by the driver, the driver may wish to more easily perform the manual shifting with a smaller force.

SUMMARY OF THE INVENTION

An object of the present invention is to make it possible both to offer mechanical operation feeling by manual shifting and to offer easy shifting operation by automatic shifting in a vehicle having both a manual shifting function and an automatic shifting function.

A transmission-equipped vehicle according to an aspect of the present invention is a vehicle including a transmission that changes rotational speed derived from rotational power output from a prime mover, and the vehicle includes: a shifting operation member operated by a driver; a manual shifting power transmission mechanism that transmits, to the transmission, an operation force applied to the shifting operation member by the driver, the operation force acting as shifting power for a shifting process; a shifting actuator; an automatic shifting power transmission mechanism that transmits a drive force of the shifting actuator to the manual shifting power transmission mechanism, the drive force acting as the shifting power; and a controller that controls the shifting actuator, the controller including: an automatic shifting control section that carries out automatic shifting control in which the shifting actuator is driven in response to a predetermined automatic shifting command; and an interference prevention control section that controls the automatic shifting control section so as to prohibit simultaneous occurrence of a manual shifting process induced by operation of the shifting operation member and an automatic shifting process induced by the shifting actuator.

With the above configuration, the driver can receive a reaction force from the transmission via the manual shifting power transmission mechanism during operation of the shifting operation member. Thus, the driver can experience the feeling of mechanically shifting the transmission and enjoy the pleasure of vehicle driving. Additionally, since the automatic shifting control section is controlled so as to prohibit simultaneous occurrence of a manual shifting process induced by operation of the shifting operation member and an automatic shifting process induced by the shifting actuator, the shifting power applied from the shifting operation member and the shifting power applied from the shifting actuator are prevented from interfering (conflicting) with each other. Thus, in the vehicle having both a manual shifting function and an automatic shifting function, it is possible both to offer mechanical operation feeling by manual shifting and to offer easy shifting operation by automatic shifting.

The vehicle may further include a manual shifting operation detector that detects operation of the shifting operation member by the driver and may have a configuration in which when operation of the shifting operation member is detected, the interference prevention control section prohibits the automatic shifting control section from carrying out the automatic shifting control, regardless of the automatic shifting command.

With the above configuration, even if an automatic shifting command is issued while the driver is operating the shifting operation member to perform manual shifting, the automatic shifting command is disabled, and only the manual shifting is carried out. This can advantageously prevent interference (conflict) between the shifting power applied from the shifting operation member and the shifting power applied from the shifting actuator.

The vehicle may have a configuration in which: the shifting actuator is an electric motor; and when a monitoring parameter including the amount of operating current of the electric motor falls outside a predetermined acceptable range while the automatic shifting control is being carried out, the interference prevention control section causes the automatic shifting control section to halt the automatic shifting control.

With this configuration, when the monitoring parameter shows an abnormal behavior due to the automatic shifting control being carried out while the driver is operating the shifting operation member to perform manual shifting, the automatic shifting control is halted, and only the manual shifting is carried out. This can advantageously prevent interference (conflict) between the shifting power applied from the shifting operation member and the shifting power applied from the shifting actuator.

The vehicle may have a configuration in which the controller further includes a shifting restriction section that, when a predetermined shifting prohibition condition is met, controls the shifting actuator so as to counteract a manual shifting process induced by operation of the shifting operation member.

With the above configuration, the driver can be restricted from carrying out manual shifting using the shifting operation member in a situation where shifting should not take place.

The vehicle may have a configuration in which the controller further includes a shifting restriction section that, when a predetermined shifting prohibition condition is met, controls the automatic shifting control section so as to restrict an automatic shifting process induced by the automatic shifting control.

With the above configuration, automatic shifting can be restricted from being carried out in a situation where shifting should not take place.

The vehicle may further include a gear position detector that detects which gear position the transmission is in, a main clutch provided between the prime mover and the transmission, and a clutch state detector that detects which state the main clutch is in, and may have a configuration in which: the controller further includes a traveling/stopping determination section that determines whether the vehicle is traveling or stopped; the prime mover is an internal combustion engine; and the shifting prohibition condition is met when the vehicle is determined to be stopped, the gear position of the transmission is determined to be a neutral position, and the main clutch is determined to be in an engaged state.

With the above configuration, when the vehicle is stopped with the transmission in the neutral position and the main clutch in the engaged state, the prime mover which is an internal combustion engine can be prevented from stalling due to shifting of the transmission from the neutral position to another gear position (power transmission state).

The vehicle may further include a gear position detector that detects which gear position the transmission is in, and may have a configuration in which the controller further includes: a shifting failure determination section that determines, based on a detection result of the gear position detector, whether shifting failure has occurred in which a manual shifting process induced by operation of the shifting operation member is incomplete; and a shifting failure resolving section that controls at least one of the shifting actuator and the prime mover so as to complete the manual shifting process.

With the above configuration, when a shifting process ceases in an incomplete state because of an insufficient operation force applied to the shifting operation member by the driver, the power of at least one of the shifting actuator and the prime mover acts on the transmission in such a direction as to resolve the shifting failure. Thus, shifting failure caused by the driver can be automatically resolved.

The vehicle may further include a gear position detector that detects which gear position the transmission is in and a rotational speed sensor that detects rotational speed of the prime mover, and may have a configuration in which: the transmission is a dog clutch transmission; the controller further includes a prime mover control section that controls the prime mover; and when the transmission is detected to be in an out-of-gear state by the gear position detector while the interference prevention control section controls the automatic shifting control section so as to prohibit simultaneous occurrence of the manual shifting process and the automatic shifting process, the prime mover control section stores a value of the rotational speed of the prime mover as a reference rotational speed, the value of the rotational speed being detected by the rotational speed sensor, and the prime mover control section controls the prime mover so as to keep the rotational speed of the prime mover from becoming higher than the reference rotational speed by an amount equal to or greater than a predetermined value until the out-of-gear state is resolved.

With the above configuration, the rotational speed of the prime mover is prevented from being excessively high during the out-of-gear state.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

Figure 1:
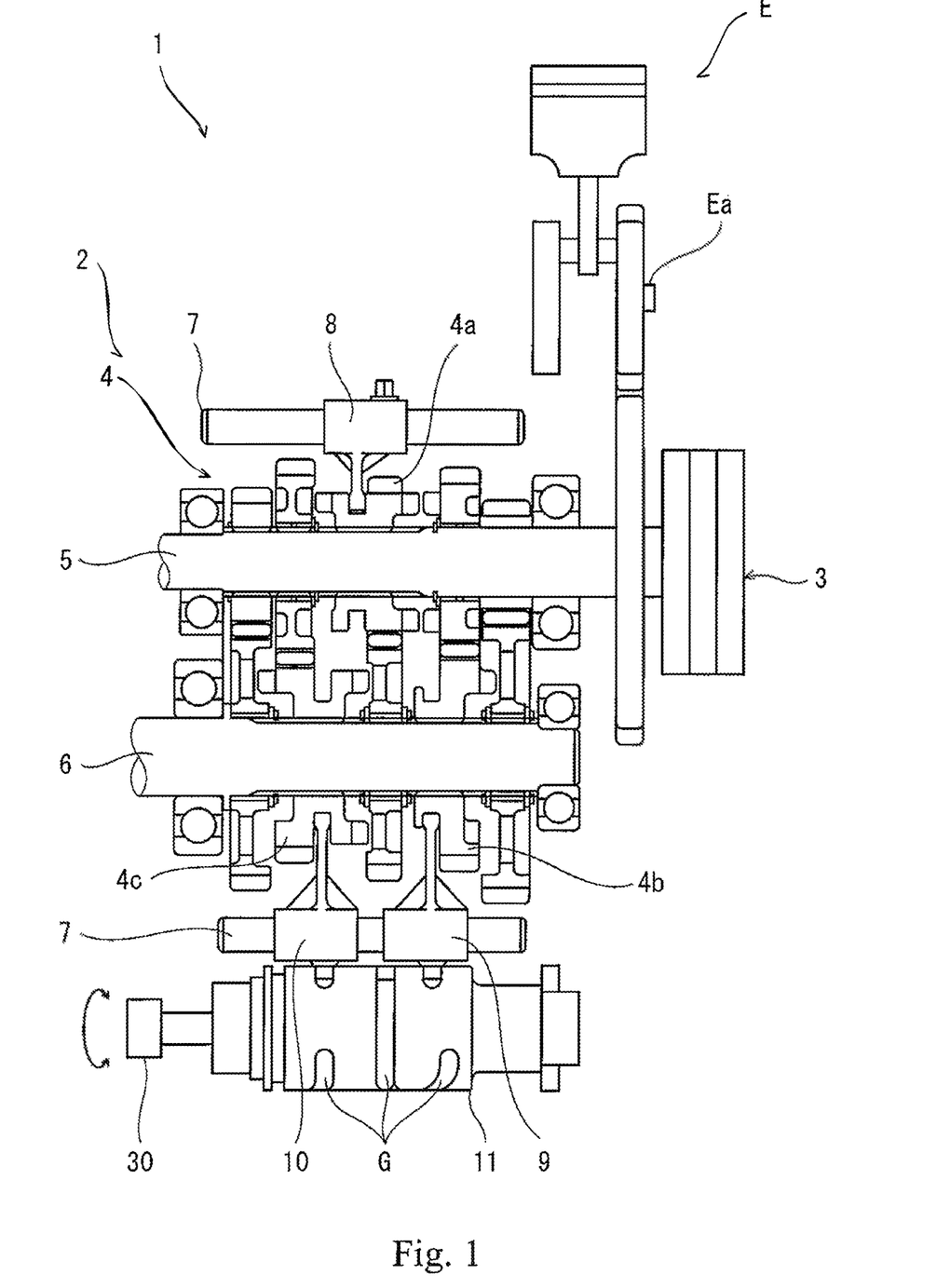
FIG. 1 is a schematic diagram of a transmission-equipped vehicle according to an embodiment.

FIG. 1 is a schematic diagram of a transmission-equipped vehicle 1 according to an embodiment. As shown in FIG. 1, the vehicle 1 includes a prime mover E (e.g., an internal combustion engine or an electric motor), a transmission 2 that changes rotational speed derived from rotational power generated by the prime mover E, and a main clutch 3 (e.g., a multi-plate clutch) provided between the prime mover E and the transmission 2. The vehicle 1 may be any vehicle that changes rotational speed derived from rotational power of the prime mover E by the transmission 2 and that uses the resulting power as power for travel of the vehicle. The vehicle 1 is, for example, a motorcycle. The transmission 2 is a transmission configured to transmit power from an input shaft 5 to an output shaft 6 via a plurality of gear trains 4 having different reduction gear ratios and perform a shifting process by selection of any one of the gear trains 4. For example, the transmission 2 is a dog clutch transmission. The transmission 2 has a first gear position, a second gear position, and a neutral position located between the first gear position and the second gear position.

To the input shaft 5 of the transmission 2 is transmitted the rotational power from a crank shaft Ea of the prime mover E. To the output shaft 6 is connected a power output mechanism (e.g., a chain or a belt) that transmits power to a drive wheel (not shown). In the transmission 2, shift forks 8 to 10 are slidably supported by support shafts 7 disposed parallel to the input shaft 5 and the output shaft 6. One end of the shift fork 8 is connected to a dog gear 4a of the input shaft 5, and respective one ends of the other shift forks 9 and 10 are connected to dog gears 4b and 4c of the output shaft 6.

The other ends of the shift forks 8 to 10 are fitted in guide grooves G of a shift drum 11. When the shift drum 11 rotates upon transmission of operation power to one end of the shift drum 11, the shift forks 8 to 10 guided by the guide grooves G cause the corresponding dog gears 4a to 4c to slide along the output shaft 6 so that one of the gear trains 4 that has a desired reduction gear ratio enters a power transmission state. In this manner, a power transmission path with a desired shift position is selected.

Figure 2:
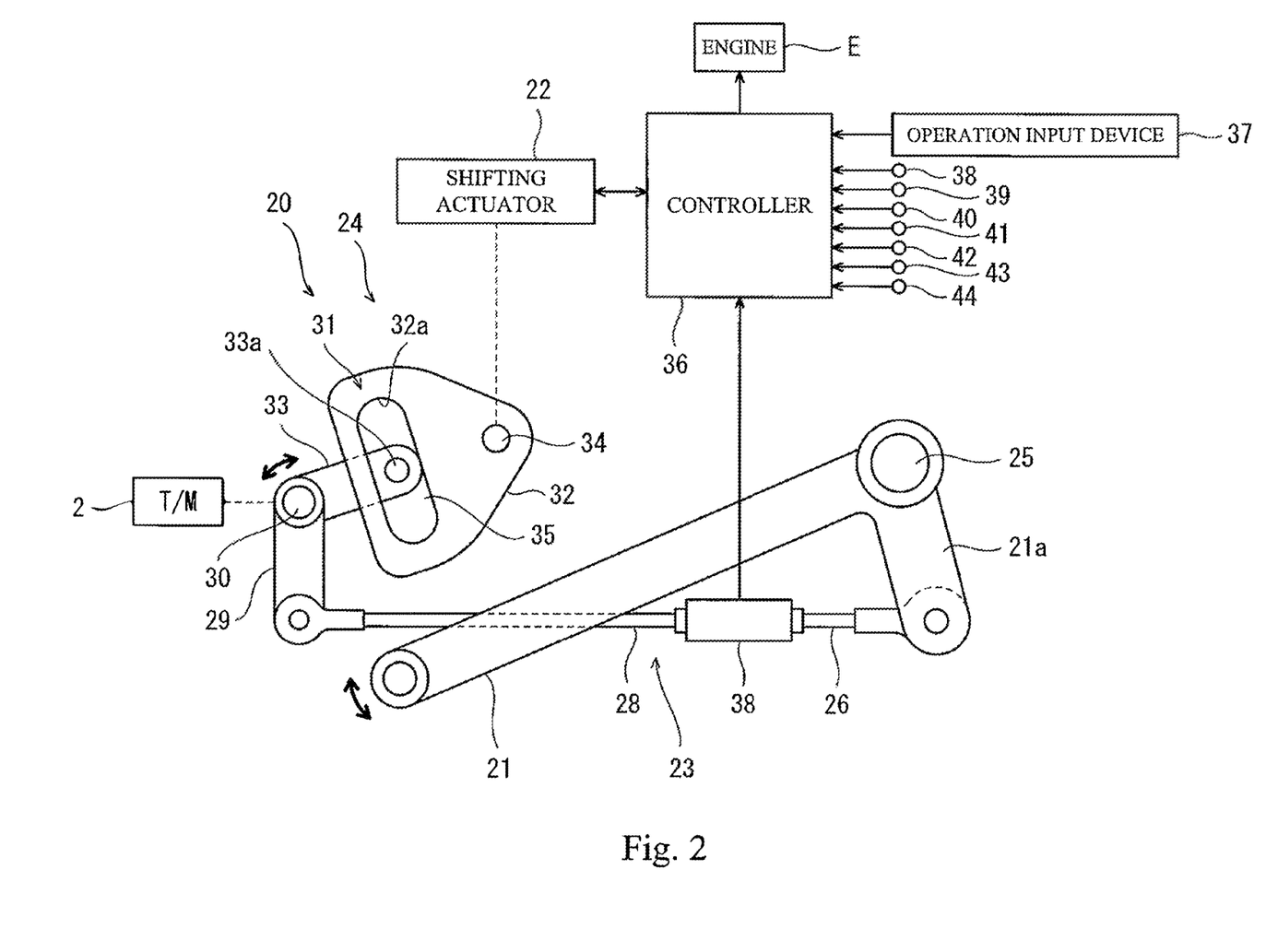
FIG. 2 is a schematic diagram of shifting power transmission mechanisms of a shifting system of the vehicle shown in FIG. 1.

FIG. 2 is a schematic diagram of shifting power transmission mechanisms of a shifting system 20 of the vehicle 1 shown in FIG. 1. In the shifting system 20, as shown in FIG. 2, the transmission 2 is rotatable by an operation force applied to a shifting operation lever 21 (shifting operation member) by the driver and is rotatable also by a drive force of a shifting actuator 22. That is, the operation force applied to the shifting operation lever 21 by the driver and the drive force of the shifting actuator 22 can be used as shifting power for actuating the transmission 2. Specifically, the shifting operation lever 21 operated by the driver can rotate the shift drum 11 (see FIG. 1), and the shifting actuator 22 can also rotate the shift drum 11. In the present embodiment, an electric motor is used as the shifting actuator 22.

The shifting system 20 includes: a manual shifting power transmission mechanism 23 that transmits, to the shift drum 11 (see FIG. 1) of the transmission 2, an operation force applied to the shifting operation lever 21 by the driver; and an automatic shifting power transmission mechanism 24 that transmits a drive force of the shifting actuator 22 to the manual shifting power transmission mechanism 23. The manual shifting power transmission mechanism 23 mechanically connects the shifting operation lever 21 to one end of the shift drum 11. The shifting operation lever 21 is swung by the driver (e.g., by a foot of the driver) about a swingably supporting shaft 25 serving as a swinging axis. The manual shifting power transmission mechanism 23 includes a first rod 26, a load sensor 38 (manual shifting operation detector), a second rod 28, a swinging arm 29, and a rotating member 30.

One end of the first rod 26 is connected to a swinging portion 21a provided integrally with the shifting operation lever 21. Upon operation of the shifting operation lever 21, the swinging portion 21a swings about the swingably supporting shaft 25. The second rod 28 is disposed in alignment with the first rod 26, and the other end of the first rod 26 is connected to one end of the second rod 28 via the load sensor 38. The other end of the second rod 28 is coupled to one end of the swinging arm 29. The other end of the swinging arm 29 is secured to the rotating member 30. The rotating member 30 is mounted to one end of the shift drum 11 (see FIG. 1) so as to rotate together with the shift drum 11.

When the shifting operation lever 21 is operated in one direction, the rotating member 30 is rotated in the one direction via the first rod 26, load sensor 38, second rod 28, and swinging arm 29, and the shift drum 11 rotates to the shift-up side. When the shifting operation lever 21 is operated in the opposite direction, the rotating member 30 is rotated in the opposite direction, and the shift drum 11 rotates to the shift-down side. When the shifting operation lever 21 is operated, the operation is detected by the load sensor 38. Although the load sensor 38 is described as an example of the manual shifting operation detector, the manual shifting operation detector may be another type of sensor. For example, the manual shifting operation detector may be a displacement sensor that detects angular displacement of the shifting operation lever 21 or shift drum 11 or may be a motion sensor or a camera that detects the motion of the driver (a foot of the driver).

The automatic shifting power transmission mechanism 24 is a mechanism that transmits a drive force of the shifting actuator 22 to the rotating member 30 to rotate the rotating member 30. In the present embodiment, the automatic shifting power transmission mechanism 24 includes a relief portion 31 provided between the shifting actuator 22 and the rotating member 30. The automatic shifting power transmission mechanism 24 may be configured without the relief portion 31. The relief portion 31 is capable of transmitting a rotational drive force of the shifting actuator 22 to the rotating member 30, and prevents transmission to the shifting actuator 22 of the motion of the manual shifting power transmission mechanism 23 actuated upon operation of the shifting operation lever 21.

Specifically, the relief portion 31 includes an engaged member 32 and an engaging member 33. The engaged member 32 has an engaged portion 32a and moves in conjunction with the shifting actuator 22. For example, the engaged member 32 is a plate member rotated by a rotating shaft 34 driven by the shifting actuator 22, and the engaged portion 32a is an longitudinal engaged hole formed in the engaged member 32. The engaging member 33 has an engaging portion 33a engaging with the engaged portion 32a, and moves in conjunction with the motion of the manual shifting power transmission mechanism 23 (in particular the rotating member 30). For example, the engaging member 33 is an arm-like member projecting from the rotating member 30, and the engaging portion 33a is an engaging pin provided at the tip of the engaging member 33 and inserted in the engaged hole provided as the engaged portion 32a.

The relief portion 31 has a clearance portion 35 provided between the engaged portion 32a and the engaging portion 33a in the direction of the motion of the engaging member 33 which occurs in conjunction with the motion of the manual shifting power transmission mechanism 23. The clearance portion 35 is formed over the entire region in which the engaging portion 33a can be displaced in conjunction with the motion of the manual shifting power transmission mechanism 23. Thus, when the transmission 2 is manually shifted by operation of the shifting operation lever 21, the engaging portion 33a is displaced (undergoes lost motion) within the clearance portion 35 and does not interfere with the engaged member 32 even though the engaging member 33 pivots in conjunction with the rotation of the rotating member 30. That is, transmission of power from the manual shifting power transmission mechanism 23 is interrupted by the clearance portion 35, and transmission of the power to the shifting actuator 22 via the engaged member 32 is prevented. Thus, mechanical resistance caused by the shifting actuator 22 does not act on the driver during operation of the shifting operation lever 21.

The shifting system 20 includes a controller 36, an operation input device 37, and various detectors 38 to 44. The controller 36 controls the shifting actuator 22, the prime mover E, and an output device 60 based on signals from the operation input device 37 and the detectors 38 to 44. When the transmission 2 is automatically shifted by a drive force of the shifting actuator 22, rotation of the rotating shaft 34 caused by the shifting actuator 22 leads to the engaged member 32 being swung until the engaged portion 32a comes into contact with the engaging portion 33a, and then the engaged member 32 is further swung by the shifting actuator 22, so that the engaging portion 33a is pushed by the engaged portion 32a. This causes rotation of the rotating member 30 and hence rotation of the shift drum 11, thus accomplishing the automatic shifting. After completion of the shifting process induced by the shifting actuator 22, the shifting actuator 22 is controlled to return the engaging portion 33a to the center of the hole of the engaged member 32 in the direction of the motion of the engaging portion 33a.

An operation force applied to the shifting operation lever 21 by the driver is transmitted as shifting power for a shifting process to the shift drum 11 of the transmission 2 via the manual shifting power transmission mechanism 23. Thus, the driver can receive a reaction force from the transmission 2 and experience improved operation feeling during manual shifting. Therefore, in the vehicle 1 having both a manual shifting function and an automatic shifting function, the driver can have a desired operation sensation during manual shifting and experience good operation feeling.

Figure 3:
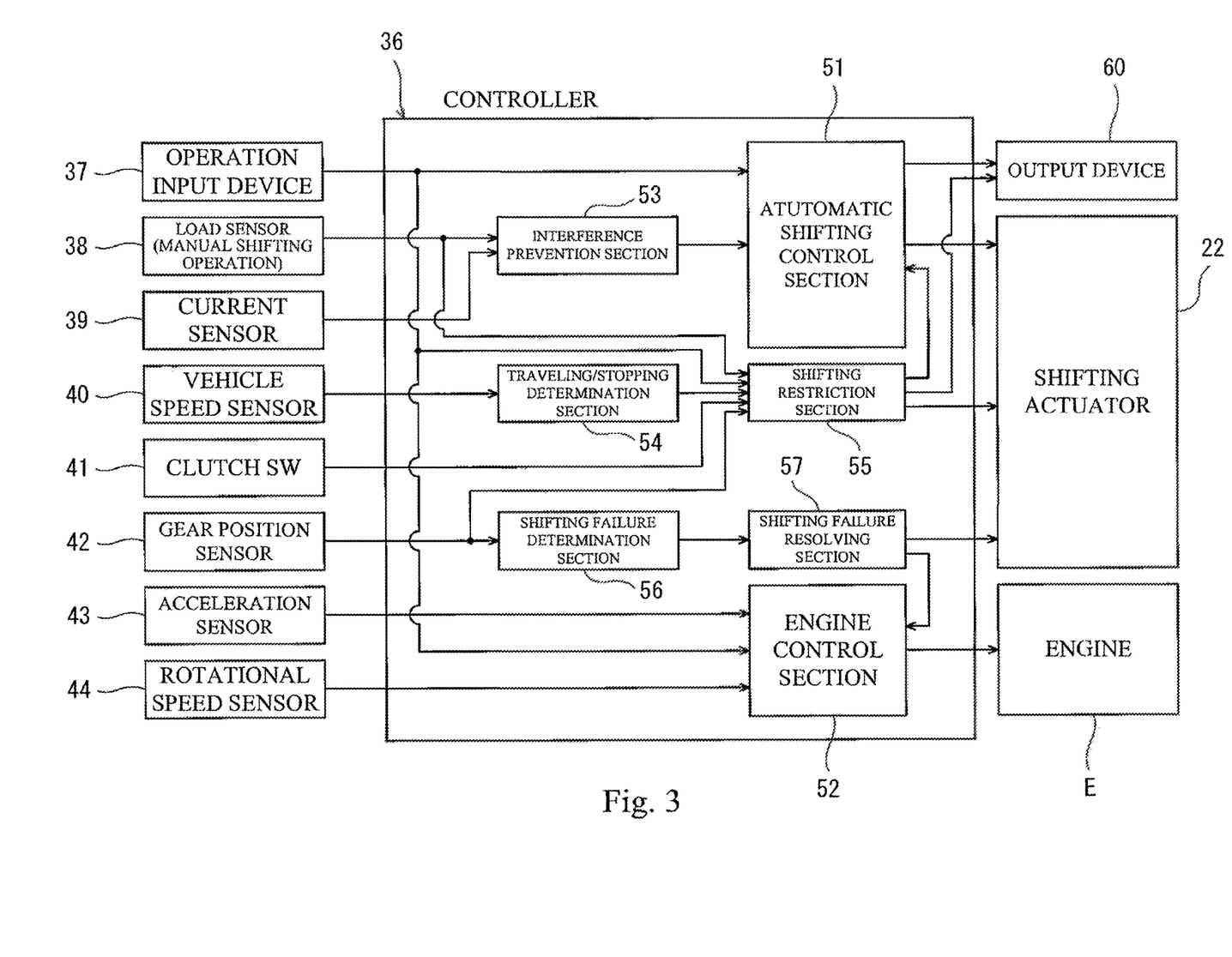
FIG. 3 is a control block diagram of the shifting system shown in FIG. 2.

FIG. 3 is a control block diagram of the shifting system 20 shown in FIG. 2. As shown in FIG. 3, the operation input device 37, the load sensor 38 (manual shifting operation detector), a current sensor 39, a vehicle speed sensor 40, a clutch switch 41 (clutch state detector), a gear position sensor 42, an acceleration sensor 43, and a rotational speed sensor 44 are connected to the input of the controller 36.

The operation input device 37 is operated by the driver (e.g., by a hand of the driver) and is, for example, a touch panel display, an input button, or an input lever. The load sensor 38 detects a load imposed on the manual shifting power transmission mechanism 23 to detect whether the shifting operation lever 21 is operated by the driver. The current sensor 39 detects the amount of a current flowing through the shifting actuator 22 which is an electric motor. The vehicle speed sensor 40 detects the traveling speed of the vehicle 1. For example, the vehicle speed sensor 40 detects the rotational speed of the non-driven wheel.

The clutch switch 41 detects the state (engaged state or disengaged state) of the main clutch 3. Instead of detecting the state (engaged state or disengaged state) of the main clutch 3, the clutch switch 41 may detect, for example, the operation state (clutch-engaged state or clutch-disengaged state) of a non-illustrated clutch operation member (driving operation member) such as a clutch lever which is operated by the driver. A sensor may be used instead of the switch as the clutch state detector.

The gear position sensor 42 (gear position detector) detects the shift position by determining which of the gear trains 4 of the transmission 2 has been selected as a gear train entering the power transmission state. The gear position sensor 42 may detect the shift position of the transmission 2 continuously or stepwise. The acceleration sensor 43 detects the degree of operation of a non-illustrated acceleration operation member (driving operation member) such as an accelerator grip. When the prime mover E is an internal combustion engine, a throttle opening degree sensor that detects the opening degree of a throttle valve acting in conjunction with the acceleration operation member may be used instead of the acceleration sensor 43. The rotational speed sensor 44 detects the rotational speed of the prime mover E.

The controller 36 includes hardware components including a processor, a volatile memory, a non-volatile memory, and an I/O interface. The controller 36 includes software components including an automatic shifting control section 51, a prime mover control section 52, an interference prevention control section 53, a traveling/stopping determination section 54, a shifting restriction section 55, a shifting failure determination section 56, and a shifting failure resolving section 57. That is, the sections 51 to 57 of the controller 36 are implemented through processing that the processor performs using the volatile memory according to programs stored in the non-volatile memory.

The automatic shifting control section 51 carries out automatic shifting control in which the automatic shifting control section 51 drives the shifting actuator 22 in response to a predetermined automatic shifting command to rotate the shift drum 11. The automatic shifting command can be input to the automatic shifting control section 51 from various sources. For example, the automatic shifting command is input to the automatic shifting control section 51 when an input operation for giving an instruction to carry out automatic shifting is performed by the driver on the operation input device 37. When carrying out the automatic shifting control, the automatic shifting control section 51 instructs the output device 60 (e.g., a display device, a sound generation device, or a vibrator) to perform an output action (e.g., displaying, sound output, or vibration generation) that allows the driver to know that the automatic shifting control is being carried out.

The automatic shifting control section 51 may adjust the motion speed of the shifting actuator 22 so as to reduce the shifting shock. For example, the automatic shifting control section 51 may decrease the motion speed of the shifting actuator 22 immediately before the dog gears 4a to 4c come into mesh. When the temperature of the shifting actuator 22 which is an electric motor exceeds a predetermined upper limit temperature, the automatic shifting control section 51 may turn off the automatic shifting function to stop the current supply to the shifting actuator 22. In this instance, the automatic shifting command may be completely disabled, or an adjustment may be made to increase the interval between automatic shifting processes. The temperature of the shifting actuator 22 may be estimated from the amount of the operating current of the shifting actuator 22 or may be directly detected by a temperature sensor. When it is determined that an overcurrent flows through the shifting actuator 22 (e.g., when it is determined that a current exceeding an upper limit has flowed for a period of time longer than a predetermined period of time), the automatic shifting control section 51 may stop the motion of the shifting actuator 22.

The prime mover control section 52 controls the prime mover E based on detection signals of the acceleration sensor 43, rotational speed sensor 44, and gear position sensor 42 and a signal input from the operation input device 37. When the automatic shifting command input through the operation input device 37 is detected in a situation where the prime mover E is determined to be accelerating based on a detection signal of the rotational speed sensor 44, the prime mover control section 52 corrects a command value for the prime mover E to deceleration side (for example, when the prime mover is an internal combustion engine, the ignition is temporarily stopped or the throttle opening degree is temporarily reduced). When the automatic shifting command input through the operation input device 37 is detected in a situation where the prime mover E is determined to be decelerating based on a detection signal of the rotational speed sensor 44, the prime mover control section 52 corrects the command value for the prime mover E to acceleration side (for example, when the prime mover is an internal combustion engine, the throttle opening degree is temporarily increased).

As a result of this control, the load imposed on the engaged dog gear among the dog gears 4a to 4c (see FIG. 1) of the transmission 2 in the rotational direction is temporarily removed during a shifting process. Thus, the dog clutch can be actuated without interruption of power transmission between the prime mover E and the transmission 2, and this allows the driver to perform easy and quick shifting operation without having to operate the main clutch 3.

The interference prevention control section 53 controls the automatic shifting control section 51 so as to prohibit simultaneous occurrence of a manual shifting process induced by operation of the shifting operation lever 21 and an automatic shifting process induced by the shifting actuator 22. This advantageously makes it possible both to offer mechanical operation feeling by manual shifting and to offer easy shifting operation by automatic shifting in the vehicle 1 having both a manual shifting function and an automatic shifting function.

For example, when the load sensor 38 detects operation of the shifting operation lever 21, the interference prevention control section 53 prohibits the automatic shifting control section 51 from carrying out the automatic shifting control, even if an automatic shifting command is issued from the operation input device 37. In this case, even if an automatic shifting command is issued while the driver is operating the shifting operation lever 21 to perform manual shifting, the automatic shifting command is disabled, and only the manual shifting is carried out. Thus, the shifting power applied from the shifting operation lever 21 and the shifting power applied from the shifting actuator 22 are prevented from interfering (conflicting) with each other.

When the automatic shifting control is being carried out, the interference prevention control section 53 monitors monitoring parameters including the amount of the operating current of the shifting actuator 22 and the period of time during which the current is supplied to the shifting actuator 22. When the monitoring parameters fall outside the acceptable ranges (e.g., when the period of time during which the amount of the operating current is outside the acceptable range exceeds a predetermined period of time), the interference prevention control section 53 causes the automatic shifting control section 51 to halt the automatic shifting control and causes the shifting actuator 22 to return to an initial position in which the shifting actuator 22 is in before the shifting process.

In this case, when a monitoring parameter shows an abnormal behavior due to the automatic shifting control being carried out while the driver is operating the shifting operation lever 21 to perform manual shifting, the automatic shifting control is halted, and only the manual shifting is carried out. This can advantageously prevent interference (conflict) between the shifting power applied from the shifting operation lever 21 and the shifting power applied from the shifting actuator 22.

When the interference prevention control section 53 has started the control for preventing interference (conflict) between the shifting power applied from the shifting operation lever 21 and the shifting power applied from the shifting actuator 22, the transmission may be in an out-of-gear state where the dog gears 4a to 4c are disengaged because the transmission is making the transition from one shift position to another adjacent shift position. When the gear position sensor 42 detects the out-of-gear state at the start of the interference prevention control, the shifting actuator 22 can be controlled to return the transmission to the original shift position (i.e., the one shift position).

When the out-of-gear state is detected at the start of the interference prevention control, the prime mover control section 52 temporarily stores a value of the rotational speed of the prime mover E as a reference rotational speed, the value of the rotational speed being detected by the rotational speed sensor 44. The primer mover control section 52 controls the prime mover E so as to keep the rotational speed of the prime mover E from becoming higher than the reference rotational speed by an amount equal to or greater than a predetermine value until the out-of-gear state is resolved. The predetermined value can be selected, for example, from among values ranging from 0 rpm to 500 rpm. Thus, the rotational speed of the prime mover E is prevented from being excessively high during the out-of-gear state.

The traveling/stopping determination section 54 determines whether the vehicle 1 is traveling or stopped based on a detection signal of the vehicle speed sensor 40. Instead of making the determination based on the vehicle speed, the traveling/stopping determination section 54 may determine that the vehicle is stopped when a side stand is in use and determine that the vehicle is traveling when the side stand is not in use.

When a predetermined shifting prohibition condition is met, the shifting restriction section 55 controls the shifting actuator 22 so as to counteract a manual shifting process induced by operation of the shifting operation lever 21. This restricts the driver from carrying out manual shifting using the shifting operation lever 21 in a situation where shifting should not take place.

The shifting prohibition condition may be met in any of various situations where the vehicle is determined to be in a state in which shifting should not be performed. In an example where the prime mover E is an internal combustion engine, the shifting prohibition condition is met when the traveling/stopping determination section 54 determines that the vehicle 1 is stopped, the clutch switch 41 detects that the main clutch 3 is in an engaged state, and the gear position sensor 42 detects that the transmission 2 is in the neutral position. That is, when the load sensor 38 detects that the shifting operation lever 21 is operated to shift the transmission 2 into a position other than the neutral position while the vehicle is stopped with the transmission 2 in the neutral position and the main clutch 3 in the engaged state, the shifting restriction section 55 controls the shifting actuator 22 so that the shifting actuator 22 acts in such a direction as to block manual shifting. This prevents the prime mover E from stalling due to establishment of the power transmission path between the prime mover E and the drive wheel while the vehicle is stopped.

When the shifting prohibition condition is met, the shifting restriction section 55 controls the automatic shifting control section 51 so as to restrict an automatic shifting process induced by the automatic shifting control. In an example where the prime mover E is an internal combustion engine, when the vehicle 1 is determined to be stopped, and the main clutch 3 is detected to be in an engaged state, and the transmission 2 is detected to be in the neutral position, the shifting restriction section 55 prohibits the automatic shifting control section 51 from carrying out the automatic shifting control even if the driver issues an automatic shifting command through the operation input device 37. This restricts automatic shifting from being carried out in a situation where shifting should not take place.

When restricting the manual shifting or automatic shifting, the shifting restriction section 55 instructs the output device 60 (e.g., a display device, a sound generation device, or a vibrator) to perform an output action (e.g., displaying, sound output, or vibration generation) that allows the driver to know that shifting is restricted.

The shifting failure determination section 56 determines, based on a detection result of the gear position sensor 42, whether shifting failure has occurred in which a manual shifting process induced by operation of the shifting operation lever 21 is incomplete. For example, when the gear position sensor 42 detects that a shift position (target shift position) has not been reached even after a predetermined period of time has elapsed from start of the shifting from another shift position adjacent to the target shift position, the shifting failure determination section 56 determines that shifting failure has occurred.

When the shifting failure determination section 56 determines that shifting failure has occurred, the shifting failure resolving section 57 controls the shifting actuator 22 so as to complete the shifting process. Specifically, the shifting failure resolving section 57 drives the shifting actuator 22 in such a direction that the transmission 2 is actuated toward the target shift position and, when the target shift position is determined to have been reached based on a detection signal of the gear position sensor 42, the shifting failure resolving section 57 stops driving the shifting actuator 22.

With this feature, when a shifting process ceases in an incomplete state because of an insufficient operation force applied to the shifting operation lever 21 by the driver, the shifting actuator 22 acts on the transmission 2 in such a direction as to resolve the shifting failure. Thus, shifting failure caused by the driver can be automatically resolved.

When the shifting failure determination section 56 determines that shifting failure has occurred, the shifting failure resolving section 57 may instruct the prime mover control section 52 to control the prime mover E so as to complete the shifting process. That is, shifting failure can occur when engagement of the dog clutch (meshing of the dog gears 4a to 4c) of the transmission 2 fails due to a large difference in rotational speed between the engaging side and engaged side of the dog clutch and, in this case, the rotational speed of the prime mover E may be changed to decrease the difference in rotational speed and resolve the shifting failure. Specifically, the shifting failure resolving section 57 may instruct the prime mover control section 52 to drive the prime mover E in such a direction as to decrease the difference in rotational speed and, when the target shift position is determined to have been reached based on a detection signal of the gear position sensor 42, the shifting failure resolving section 57 may instruct the prime mover control section 52 to return to the normal control mode.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A transmission-equipped vehicle comprising a transmission that changes rotational speed derived from rotational power output from a prime mover, the vehicle comprising:
a shifting operation member operated by a driver;
a manual shifting power transmission mechanism that transmits, to the transmission, an operation force applied to the shifting operation member by the driver, the operation force acting as shifting power for a shifting process;
a shifting actuator;
an automatic shifting power transmission mechanism that transmits a drive force of the shifting actuator to the manual shifting power transmission mechanism, the drive force acting as the shifting power; and
a controller that controls the shifting actuator,
the controller comprising:
an automatic shifting control section that carries out automatic shifting control in which the shifting actuator is driven in response to a predetermined automatic shifting command; and
an interference prevention control section that controls the automatic shifting control section so as to prohibit simultaneous occurrence of a manual shifting process induced by operation of the shifting operation member and an automatic shifting process induced by the shifting actuator.

2. The transmission-equipped vehicle according to claim 1, further comprising a manual shifting operation detector that detects operation of the shifting operation member by the driver, wherein when operation of the shifting operation member is detected, the interference prevention control section prohibits the automatic shifting control section from carrying out the automatic shifting control, regardless of the automatic shifting command.

3. The transmission-equipped vehicle according to claim 1, wherein
the shifting actuator is an electric motor, and
when a monitoring parameter including the amount of operating current of the electric motor falls outside a predetermined acceptable range while the automatic shifting control is being carried out, the interference prevention control section causes the automatic shifting control section to halt the automatic shifting control.

4. The transmission-equipped vehicle according to claim 1, wherein the controller further comprises a shifting restriction section that, when a predetermined shifting prohibition condition is met, controls the shifting actuator so as to counteract a manual shifting process induced by operation of the shifting operation member.

5. The transmission-equipped vehicle according to claim 4, further comprising:
a gear position detector that detects which gear position the transmission is in;
a main clutch provided between the prime mover and the transmission; and
a clutch state detector that detects which state the main clutch is in, wherein
the controller further comprises a traveling/stopping determination section that determines whether the vehicle is traveling or stopped,
the prime mover is an internal combustion engine, and
the shifting prohibition condition is met when the vehicle is determined to be stopped, the gear position of the transmission is determined to be a neutral position, and the main clutch is determined to be in an engaged state.

6. The transmission-equipped vehicle according to claim 1, wherein the controller further comprises a shifting restriction section that, when a predetermined shifting prohibition condition is met, controls the automatic shifting control section so as to restrict an automatic shifting process induced by the automatic shifting control.

7. The transmission-equipped vehicle according to claim 1, further comprising a gear position detector that detects which gear position the transmission is in, wherein
the controller further comprises: a shifting failure determination section that determines, based on a detection result of the gear position detector, whether shifting failure has occurred in which a manual shifting process induced by operation of the shifting operation member is incomplete; and a shifting failure resolving section that controls at least one of the shifting actuator and the prime mover so as to complete the manual shifting process.

8. The transmission-equipped vehicle according to claim 1, further comprising:
- a gear position detector that detects which gear position the transmission is in; and
- a rotational speed sensor that detects rotational speed of the prime mover, wherein
- the transmission is a dog clutch transmission,
- the controller further comprises a prime mover control section that controls the prime mover, and
- when the transmission is detected to be in an out-of-gear state by the gear position detector while the interference prevention control section controls the automatic shifting control section so as to prohibit simultaneous occurrence of the manual shifting process and the automatic shifting process,
  - the prime mover control section stores a value of the rotational speed of the prime mover as a reference rotational speed, the value of the rotational speed being detected by the rotational speed sensor, and
  - the prime mover control section controls the prime mover so as to keep the rotational speed of the prime mover from becoming higher than the reference rotational speed by an amount equal to or greater than a predetermined value until the out-of-gear state is resolved.

* * * * *